(12) United States Patent
Oh et al.

(10) Patent No.: US 12,372,498 B2
(45) Date of Patent: Jul. 29, 2025

(54) DURABILITY EVALUATION SYSTEM AND DURABILITY EVALUATION METHOD

(71) Applicants: Hyundai Motor Company, Seoul (KR); Kia Corporation, Seoul (KR)

(72) Inventors: Se Do Oh, Seoul (KR); You Jin Shin, Seoul (KR); Seung Hyeok Oh, Gwangmyeong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 537 days.

(21) Appl. No.: 17/980,987

(22) Filed: Nov. 4, 2022

(65) Prior Publication Data

US 2023/0333063 A1  Oct. 19, 2023

(30) Foreign Application Priority Data

Apr. 13, 2022 (KR) .................. 10-2022-0045759

(51) Int. Cl.
*G01N 29/06* (2006.01)
*G01N 29/04* (2006.01)
*G07C 5/00* (2006.01)
*G07C 5/08* (2006.01)

(52) U.S. Cl.
CPC ......... *G01N 29/069* (2013.01); *G01N 29/045* (2013.01); *G07C 5/008* (2013.01); *G07C 5/0816* (2013.01)

(58) Field of Classification Search
CPC .... G01N 29/069; G01N 29/045; G07C 5/008; G07C 5/0816; G01M 17/007; G01M 7/02; G01M 99/007; G01M 99/008; G06F 30/27; G06N 3/08
See application file for complete search history.

(56) References Cited

U.S. PATENT DOCUMENTS

| | | | |
|---|---|---|---|
| 8,666,706 B2 * | 3/2014 | Zhou | G06F 30/23 703/2 |
| 2023/0281353 A1 * | 9/2023 | Zhang | G06F 30/20 703/1 |
| 2025/0131143 A1 * | 4/2025 | Shin | G06F 30/15 |

* cited by examiner

*Primary Examiner* — Xin Y Zhong
(74) *Attorney, Agent, or Firm* — Morgan, Lewis & Bockius LLP

(57) ABSTRACT

A durability evaluation system includes a collector collecting first data for each of meshes forming a vehicle body of a target vehicle, and second data for each mesh forming a vehicle body of a virtual vehicle in which a material or a thickness of the target vehicle is adjusted and a controller determining input data for first meshes based on the lifetime data matched to each row for the meshes of data obtained by preprocessing the first data and the second data, extracting feature data including features representing the stress analysis data for each of the first meshes and each of second meshes adjacent to the first meshes and features representing a shape of each of the first meshes, generating first synthesized data based on the feature data, and learning a method of predicting the lifetime data representing durability performance based on the feature data and the first synthesized data.

23 Claims, 11 Drawing Sheets

DURABILITY EVALUATION SYSTEM AND DURABILITY EVALUATION METHOD

CROSS-REFERENCE TO RELATED APPLICATION

The present application claims priority to Korean Patent Application No. 10-2022-0045759 filed on Apr. 13, 2022, the entire contents of which is incorporated herein for all purposes by this reference.

BACKGROUND OF THE PRESENT DISCLOSURE

Field of the Present Disclosure

The present disclosure relates to a durability evaluation system and a durability evaluation method.

Description of Related Art

Durability performance of a vehicle is a concept including functional performance that the vehicle withstands from external impact, load, environment, and the like. Because the durability performance of a vehicle is directly related to the safety of passengers in the vehicle, it is managed as an important performance indicator in a vehicle development stage.

As one of the methods for evaluating the durability performance of a vehicle, a Belgian durability test result may be utilized. The Belgian durability test is a test for evaluating the durability performance of a vehicle by driving the vehicle on a Belgian road that makes driving the vehicle harsh and extracting data on the durability performance.

This Belgian durability test may be conducted in a virtual environment. However, simulation of extracting data on durability performance by performing a Belgian durability test in a virtual environment may take a lot of time.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a system and method configured for evaluating durability performance of a vehicle based on three-dimensional (3D) data for the vehicle, determining whether the durability performance of the vehicle meets a predetermined standard, and determining a probability distribution for an indicator value representing durability performance of the vehicle.

Various aspects of the present disclosure are directed to providing a durability evaluation system including: a collector collecting first data, which is data for each of meshes forming a vehicle body of a target vehicle, and second data, which is data for each of meshes forming a vehicle body of a virtual vehicle in which a material or a thickness of the target vehicle is adjusted, the first data and the second data each being a dataset including a row and a column including a plurality of stress analysis data according to a plurality of external forces for each of the meshes and data representing a shape of each of the meshes and being matched to lifetime data corresponding to each of the meshes, and a controller configured for determining input data for a plurality of first meshes based on the lifetime data matched to each of rows for the plurality of meshes of data obtained by preprocessing the first data and the second data, extracting feature data including features representing the plurality of stress analysis data for each of the first meshes and each of second meshes adjacent to the plurality of first meshes and features representing a shape of each of the first meshes based on the input data, generating first synthesized data based on the feature data, and learning a method of predicting the lifetime data indicating durability performance based on the feature data and the first synthesized data.

The controller may include a preprocessing module configured for preprocessing the first data and the second data, a data filter configured for filtering the data preprocessed by the preprocessing module to determine a filter reference for durability performance based on the lifetime data indicating the durability performance of the plurality of meshes and determining, as input data, a plurality of rows for the plurality of first meshes representing durability performance less than the filter reference in the preprocessed data based on the filter reference, and a feature extracting module configured for extracting first features representing the plurality of stress analysis data for each of the first meshes, extracting second features obtained by applying an inverse distance weighting (IDW) to the plurality of stress analysis data for each of the second meshes, and extracting third features representing a shape of each of the first meshes to generate feature data based on the input data.

In the feature data, a value based on lifetime data corresponding to a mesh represented by each of the rows may be labeled in each of the rows.

The feature extracting module may transform each of quadrangular meshes among the plurality of first meshes from the input data into two different triangular meshes, extract one or more neighbor windows for each of the first meshes, determine a shortest distance between the plurality of first meshes and the plurality of second meshes belonging to the one or more neighbor windows, and extract the second features based on stress analysis data obtained by applying IDW to each of the one or more neighbor windows according to the shortest distance.

The controller may further include a first synthesis module configured for generating first synthesized data in which the durability performance is less than a predetermined threshold based on the feature data, and a binary classifier configured for learning a method of predicting lifetime data representing durability performance based on the first features, the second features, and the third features upon receiving the feature data and the first synthesized data and determining, as first output data, data for a mesh representing durability performance less than a predetermined threshold among the plurality of meshes.

The first synthesis module may generate the first synthesized data by oversampling the first features, the second features and the third features of each of the first rows in a SMOTE manner based on a plurality of first rows in which the durability performance is less than a predetermined threshold among the feature data.

The binary classifier may learn a method of predicting the corresponding lifetime data based on the first features, the second features, and the third features for each of the rows of the feature data and the first synthesized data and determine, as the first output data, a plurality of second rows for meshes in which durability performance indicated by the predicted lifetime data among the feature data is less than the predetermined threshold according to a learning result.

The controller may further include a second synthesis module configured for generating second synthesized data representing durability performance belonging to a predetermined number of durability probability sections based on the first output data, and a probability inferring unit determining, as second output data, data representing a probability of belonging to each of the predetermined number of durability probability sections among the plurality of second rows based on the first features, the second features, and the third features upon receiving the first output data and the second synthesized data.

The second synthesis module may generate the second synthesized data by oversampling the first features, the second features, and the third features of each of third rows in a SMOTE manner based on the plurality of third rows in which the durability performance belongs to any one of a predetermined number of durability probability sections among the first output data.

The probability inferring unit may learn a method of predicting a probability of belonging to one of the predetermined of durability probability sections based on the first features, the second features, the third features, and corresponding lifetime data for each of the second rows, and determine, as the second output data, a probability in which durability performance indicated by the predicted lifetime data belongs to one of the predetermined number of durability probability sections for each of the second rows according to a learning result.

The plurality of external forces may include two or more of FR torsion, which is an external force applied to the vehicle in a case in which a rear portion of the vehicle is fixed and a front portion of the vehicle is twisted, RR torsion, which is an external force applied to the vehicle in a case in which the front portion of the vehicle is fixed and the rear portion of the vehicle is twisted, positive max moment, which is an external force applied to the vehicle when fatigue of vibration is maximized in an upward direction in a case in which the vehicle sways sideways, negative max moment, which is an external force applied to the vehicle when fatigue of vibration is maximized in a downward direction in a case in which the vehicle sways sideways, bending, which is an external force applied to the vehicle in a case in which the vehicle is fixed and a central portion of the vehicle is bent in a vertical direction, and bouncing, which is an external force applied to the vehicle in a case in which the vehicle bounces in a vertical direction repeatedly.

Various aspects of the present disclosure are directed to providing a durability evaluation method including: preprocessing, by a controller, first data, which is data for each of meshes forming a vehicle body of a target vehicle, and second data, which is data for each of meshes forming a vehicle body of a virtual vehicle in which a material or a thickness of the target vehicle is adjusted and which is data matched to lifetime data corresponding to each of the meshes, the first data and the second data each being a dataset including a row and a column including a plurality of stress analysis data according to a plurality of external forces for each of the meshes and data representing a shape of each of the meshes and being matched to lifetime data corresponding to each of the three-dimensional (3D) meshes, filtering, by the controller, to determine input data for a plurality of first meshes based on the lifetime data matched to each of rows for the plurality of meshes of the preprocessed data, extracting, by the controller, feature data including features representing the plurality of stress analysis data for each of the first meshes and a plurality of second meshes adjacent to the plurality of first meshes and features representing a shape of each of the first meshes based on the input data, generating, by the controller, first synthesized data in which durability performance is less than a predetermined threshold based on the feature data, and learning, by the controller, a method of predicting the lifetime data representing durability performance based on the feature data and the first synthesized data.

The filtering operation may include: filtering the preprocessed data to determine a filter reference for the durability performance based on the lifetime data representing durability performance of the plurality of meshes, and determining, as input data, a plurality of rows for the plurality of first meshes representing durability performance which is less than the filter reference among the preprocessed data based on the filter reference.

The extracting of the feature data may include: extracting first features representing the plurality of stress analysis data for each of the first meshes based on the input data, extracting second features in which an inverse distance weighting (IDW) is applied to the plurality of stress analysis data for each of the second meshes adjacent to the plurality of first meshes, and extracting third features representing a shape of each of the first meshes.

The extracting of the second features may include: transforming each of the quadrangular meshes, among the plurality of first meshes, from the input data, into two different triangular meshes, extracting one or more neighbor windows for each of the first meshes, determining a shortest distance between the plurality of first meshes and the plurality of second meshes belonging to the one or more neighbor windows, and extracting the second features based on stress analysis data to which IDW is applied according to the shortest distance for each of the one or more neighbor windows.

The transforming of each of the quadrangular meshes into two different triangular meshes may include: extracting data indicating four vertices forming the quadrangular mesh, combining the four vertices to form four triangular combinations including two different triangles, measuring four internal angles based on the corner shared by the two different triangles from each of the four triangle combinations, and transforming the quadrangular meshes into two triangular meshes based on a triangle combination including a maximum angle, among the four internal angles.

The generating of the first synthesized data may include: generating the first synthesized data by oversampling the first features, the second features, and the third features of each of the first rows in a SMOTE manner based on a plurality of first rows in which the durability performance is less than a predetermined threshold among the feature data.

The learning of the method of predicting the lifetime data include: learning a method of predicting the corresponding lifetime data based on the first features, the second features, and the third features for each of the rows of the feature data and the first synthesized data, and determining, as the first output data, a plurality of second rows for meshes in which durability performance indicated by the predicted lifetime data among the feature data is less than the predetermined threshold according to a learning result The durability evaluation method may further include: generating, by the controller, second synthesized data representing durability performance belonging to a predetermined number of durability probability sections based on the first output data, and determining, by the controller, as second output data, data representing a probability of belonging to each of the predetermined number of durability probability sections among the plurality of second rows based on the first features, the second features, and the third features upon receiving the first output data and the second synthesized data.

The generating of the second synthesized data may include: generating the second synthesized data by oversampling the first features, the second features, and the third features of each of third rows in a SMOTE manner based on the plurality of third rows in which the durability performance belongs to any one of a predetermined number of durability probability sections among the first output data.

The determining of data as second output data may include: learning a method of predicting a probability of belonging to one of the predetermined number of durability probability sections based on the first features, the second features, the third features, and corresponding lifetime data for each of the second rows, and determining, as the second output data, a probability in which durability performance indicated by the predicted lifetime data belongs to one of the predetermined number of durability probability sections for each of the second rows according to a learning result.

The plurality of external forces may include two or more of FR torsion, which is an external force applied to the vehicle in a case in which a rear portion of the vehicle is fixed and a front portion of the vehicle is twisted, RR torsion, which is an external force applied to the vehicle in a case in which the front portion of the vehicle is fixed and the rear portion of the vehicle is twisted, positive max moment, which is an external force applied to the vehicle when fatigue of vibration is maximized in an upward direction in a case in which the vehicle sways sideways, negative max moment, which is an external force applied to the vehicle when fatigue is maximized in a downward direction in a case in which the vehicle sways sideways, bending, which is an external force applied to the vehicle in a case in which the vehicle is fixed and a central portion of the vehicle is bent in a vertical direction, and bouncing, which is an external force applied to the vehicle in a case in which the vehicle bounces in a vertical direction repeatedly.

Various aspects of the present disclosure are directed to providing A non-transitory computer-readable recording medium including stored thereon a program for performing a durability evaluation method, the method including: preprocessing, by a controller, first data, which is data for each of meshes forming a vehicle body of a target vehicle, and second data, which is data for each of meshes forming a vehicle body of a virtual vehicle in which a material or a thickness of the target vehicle is adjusted and which is data matched to lifetime data corresponding to each of the meshes, the first data and the second data each being a dataset including a row and a column including a plurality of stress analysis data according to a plurality of external forces for each of the meshes and data representing a shape of each of the meshes and being matched to lifetime data corresponding to each of the three-dimensional (3D) meshes, filtering, by the controller, to determine input data for a plurality of first meshes based on the lifetime data matched to each of rows for the plurality of meshes of the preprocessed data, extracting, by the controller, feature data including features representing the plurality of stress analysis data for each of the first meshes and a plurality of second meshes adjacent to the plurality of first meshes and features representing a shape of each of the first meshes based on the input data, generating, by the controller, first synthesized data in which durability performance is less than a predetermined threshold based on the feature data, and learning, by the controller, a method of predicting the lifetime data representing durability performance based on the feature data and the first synthesized data.

Through the present disclosure, durability performance of a vehicle is evaluated for each mesh representing a portion of the vehicle based on three-dimensional (3D) data including stress analysis data for a case in which each of external forces is applied to the vehicle, whether the durability performance of the vehicle meets a predetermined criterion, and the durability performance of the vehicle is determined by a probability distribution, so that a location of a portion in which the durability performance of the vehicle does not meet the predetermined criterion, among parts of the vehicle, and data representing a probability that the durability performance of each part of the vehicle belongs to a section of a predetermined criterion may be generated.

Furthermore, by dividing and outputting the probability that the durability performance belongs to the section of the predetermined criterion into a plurality of sections, misclassification in the durability performance evaluation of the vehicle may be reduced and accuracy of recognizing the durability performance may be improved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
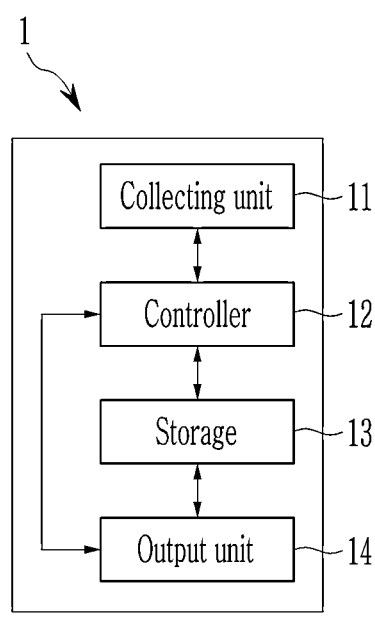
FIG. 1 is a block diagram schematically illustrating a configuration of a durability evaluation system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, the exemplary embodiments of the present disclosure will be described with reference to the accompanying drawings, in which like numbers refer to like elements throughout although the exemplary embodiments are different, and a description of the like elements various exemplary embodiments will be used for those of the different exemplary embodiment of the present disclosure. In the following description, usage of suffixes such as 'module', 'part' or 'unit' used for referring to elements is provided merely to facilitate explanation of the present disclosure, without having any significant meaning by itself. In describing the present disclosure, when a detailed explanation for a related known function or construction is considered to unnecessarily divert the gist of the present disclosure, such explanation has been omitted but would be understood by those skilled in the art. The accompanying drawings of the present disclosure aim to facilitate understanding of the present disclosure and may not be construed as limited to the accompanying drawings. Also, the present disclosure is not limited to a specific included form, but includes all modifications, equivalents, and substitutions without departing from the scope and spirit of the present disclosure.

It will be understood that, although the terms first, second, etc. may be used herein to describe various elements, these elements should not be limited by these terms. These terms are only used to distinguish one element from another.

It will be further understood that the terms "comprises" or "have" used in the present specification, specify the presence of stated features, steps, operations, components, parts, or a combination thereof, but do not preclude the presence or addition of one or more other features, numerals, steps, operations, components, parts, or a combination thereof.

A program implemented as a set of instructions embodying a control algorithm required to control other components may be provided in a component for controlling other components under a specific control condition among components according to an exemplary embodiment of the present disclosure. A control component may process input data and stored data according to the provided program to generate output data. The control component may include a non-volatile memory to store the program and a memory to store data.

A durability evaluation system according to various exemplary embodiments of the present disclosure may evaluate durability performance of a vehicle based on stress analysis data for an object. Hereinafter, an object to be subjected to durability evaluation will be described as a vehicle. However, because it takes a lot of time to model a virtual vehicle, the durability performance of the vehicle is evaluated based on stress analysis data for a vehicle body corresponding to a skeleton in the vehicle. The stress analysis data may be obtained through stress analysis simulation. The stress analysis simulation is a simulation of extracting data on stress occurring at a plurality of points of a vehicle body when a virtual vehicle is placed in a specific condition in a virtual space. The stress analysis data may indicate a stress at all points included in the vehicle body.

The Belgian road is a road used for a vehicle durability test. A virtual vehicle may be driven on a virtual Belgian road in a three-dimensional (3D) space. Driving a vehicle on the Belgian road may be considered to be the same as putting the vehicle into a variety of situations. However, to extract valid lifetime data, a virtual vehicle should be driven for a relatively long time on the virtual Belgian road. According to an exemplary embodiment of the present disclosure, the lifetime data may be data matched to a plurality of 3D meshes forming the vehicle body. The lifetime data matched to each mesh indicates durability performance of the mesh with respect to a corresponding external force, and as a value indicated by the stress analysis data is higher, the durability performance indicated by the lifetime data may be lower. Durability performance may be expressed as a mileage of a vehicle in which the corresponding mesh is maintained to perform a normal function thereof. For example, the durability performance indicated by the lifetime data may represent a driving distance of the vehicle in km unit.

In an exemplary embodiment of the present disclosure, to generate lifetime data of various vehicles, lifetime data is predicated from a plurality of stress analysis data for a virtual vehicle obtained by performing a stress analysis simulation for each of a plurality of external forces and lifetime data matched to the plurality of stress analysis data, instead of driving a virtual number of various vehicles on a virtual Belgian road. Hereinafter, for convenience of description, a virtual vehicle will be referred to as a vehicle.

According to an exemplary embodiment of the present disclosure, durability performance of a vehicle may be evaluated according to a plurality of stress analysis data for a plurality of external forces. Here, the plurality of external forces includes various types of external forces which may be applied to the vehicle when the vehicle is traveling on the Belgian road. For example, the plurality of external forces may include FR torsion, RR torsion, positive max moment, negative max moment, bending, bouncing, and the like. FR torsion may be an external force applied to the vehicle when a rear portion of the vehicle is fixed and a front portion of the vehicle is twisted. RR torsion may be an external force applied to the vehicle when the front portion of the vehicle is fixed and the rear portion of the vehicle is twisted. The positive max moment may be an external force applied to the vehicle when fatigue of vibration in an upward direction is maximized in a case in which the vehicle sways sideways. The negative max moment may be an external force applied to the vehicle when the fatigue of vibration in a downward direction is maximized in a case in which the vehicle sways sideways. Bending may be an external force applied to the vehicle when the vehicle is fixed and a central portion of the vehicle is bent in a vertical direction thereof. Bouncing may be an external force applied to the vehicle when the vehicle repeatedly bounces in a vertical direction repeatedly.

Hereinafter, a durability evaluation system for evaluating durability performance of a vehicle based on a plurality of stress analysis data of the vehicle to which each of a plurality of external forces is applied will be described with reference to the drawings.

FIG. 1 is a block diagram schematically illustrating a configuration of a durability evaluation system according to an exemplary embodiment of the present disclosure.

A durability evaluation system 1 may include a collecting unit 11, a controller 12, a storage 13, and an output unit 14.

The collecting unit 11 may collect 3D data including stress analysis data for the vehicle body and transmit the collected 3D data to the controller 12. The collecting unit 11 may receive 3D data from an external device. Alternatively, the collecting unit 11 may collect 3D data from a separate server that generates stress analysis data and transmit the collected 3D data to the controller 12.

The 3D data may include data defining a plurality of 3D meshes forming a 3D vehicle body. For example, the 3D data may include data representing a shape of each mesh, a plurality of stress analysis data obtained by performing stress analysis simulation for each of a plurality of external forces in each mesh, and lifetime data matched to each mesh. The data representing the shape of each mesh may include location information of each of vertices forming each mesh, information on a connection relationship between the vertices, and the like. The 3D data may include data representing the shape of each of the plurality of meshes and a plurality of stress analysis data for each mesh, and lifetime data corresponding to each of the plurality of meshes may be matched thereto.

Hereinafter, a mesh for describing an exemplary embodiment in an exemplary embodiment of the present disclosure is assumed to be a 3D mesh.

For example, 3D data may include stress analysis data of each mesh in a case in which FR torsion is applied to the vehicle, stress analysis data of each mesh in a case in which RR torsion is applied to the vehicle, stress analysis data of each mesh in a case in which positive max moment is applied to the vehicle, and stress analysis data of each mesh in a case in which a negative max moment is applied to the vehicle.

Hereinafter, the 3D data may further include target data that defines a plurality of meshes forming a 3D vehicle body of a vehicle, which is a target of evaluation of durability performance in a virtual space, virtual material data that defines a plurality of meshes forming a 3D vehicle body of a first virtual vehicle (hereinafter, a first virtual situation) in which a material of a vehicle is adjusted in a virtual space, and virtual thickness data that defines a plurality of meshes forming a 3D vehicle body of a second virtual vehicle (hereinafter, a second virtual situation) in which a thickness of a vehicle is adjusted in a virtual space. Each of the target data, the virtual material data, and the virtual thickness data may include data representing a shape of each of the plurality of meshes and a plurality of stress analysis data in each mesh, and lifetime data corresponding to each of the plurality of meshes may be matched thereto.

The durability evaluation system 1 evaluates durability performance of the vehicle based on a plurality of stress analysis data for each of the plurality of meshes forming the vehicle body. The controller 12 may learn a method of predicting lifetime data representing durability performance based on the plurality of stress analysis data, and extract meshes representing durability performance less than a predetermined threshold among the plurality of meshes according to a learning result. Furthermore, the controller 12 learns a method of predicting a probability in which the durability performance of each of the extracted meshes belongs to a certain section among a predetermined number of durability probability sections for the extracted meshes, and determine a probability in which each of the meshes belongs to a certain section among the predetermined number of durability probability sections according to the learning result. Hereinafter, the predetermined threshold may be previously determined as initial information.

The collecting unit 11 may collect other data including data representing the shape of each of the plurality of meshes for a different vehicle and a plurality of stress analysis data in each mesh, to which lifetime data is not matched, to apply 3D data for the different vehicle to the trained controller 12.

The controller 12 may include a processor that is configured to control the collecting unit 11, the storage 13, and the output unit 14. The processor may be, for example, a central processing unit (CPU). The controller 12 may execute other processes and programs included in the storage 13, and may transmit and receive data from the storage 13 according to a request for the execution process.

The storage 13 may include a storage device configured for storing the database. The storage 13 may match lifetime data to a plurality of meshes represented by a plurality of stress analysis data among the 3D data collected from the collecting unit 11 and store the same in the database.

The output unit 14 may display data representing the meshes extracted from the controller 12 on the user interface. Also, the output unit 14 may display a probability of belonging to each of a predetermined number of durability probability sections determined by the controller 12 on the user interface.

Hereinafter, a configuration of the controller and an operation of each component will be described with reference to FIG. 2, FIG. 3, FIG. 4, FIG. 5, FIG. 6, FIG. 7, FIG. 8, FIG. 9, FIG. 10, and FIG. 11.

Figure 2:
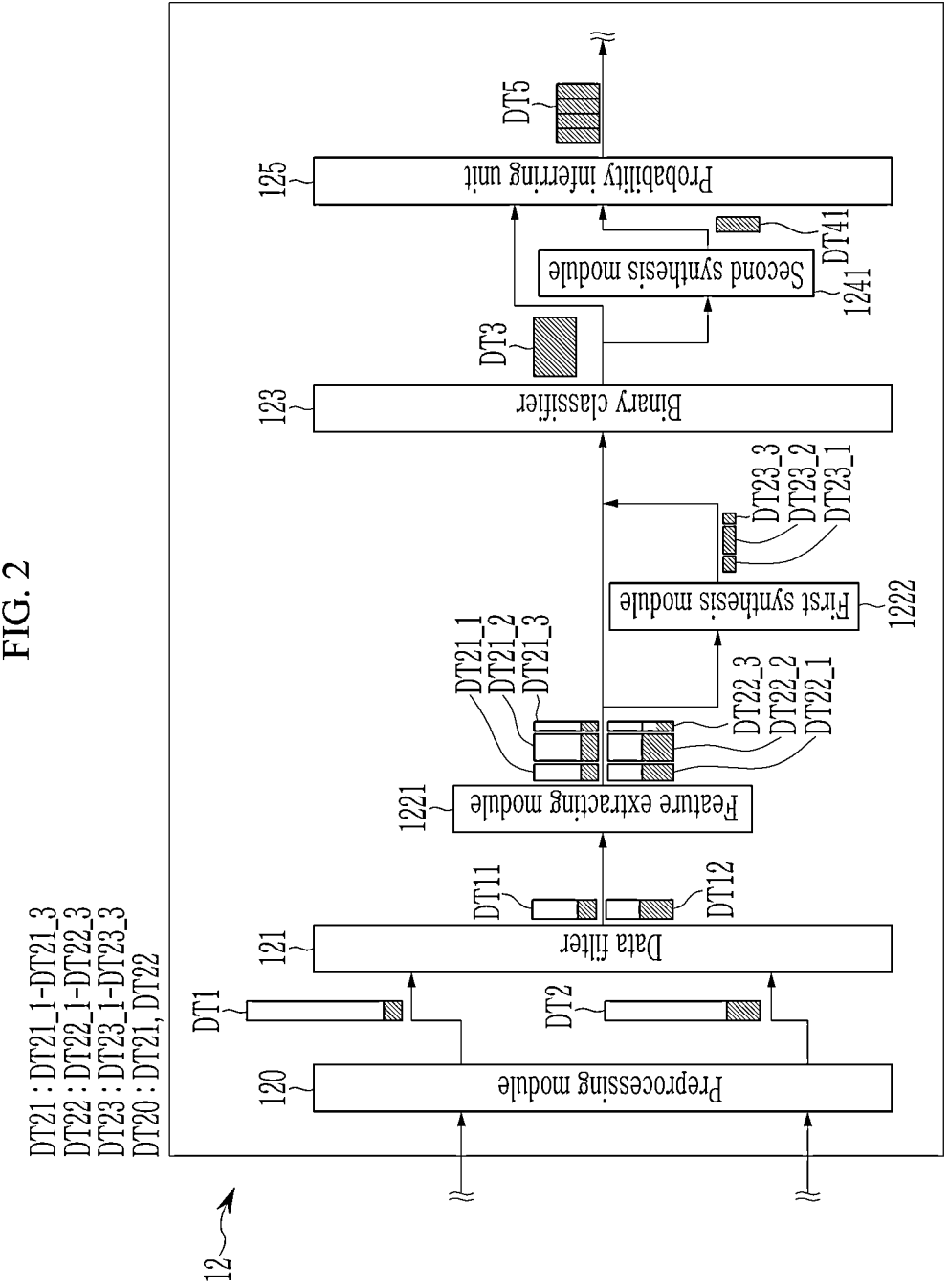
FIG. 2 is a diagram illustrating a relationship between data input to and output from each component of a controller of FIG. 1 when each component of the controller and the controller learn.

FIG. 2 is a diagram illustrating a relationship between data input to and output from each component of a controller of FIG. 1 when each component of the controller and the controller learn.

The control unit 12 may execute a program (hereinafter, referred to as a durability evaluation program) including control commands for performing a plurality of steps for evaluation of durability performance. The durability evaluation program is computer-readable and the storage unit 13 may include a computer-readable medium storing the durability evaluation program. Each of the components of the control unit 12 shown in FIG. 2 may be defined based on each of the steps performed when the control unit 12 executes the durability evaluation program. Referring to FIG. 2, the controller 12 may include a preprocessing module 120, a data filter 121, a first synthesis module 1222, a feature extracting module 1221, a binary classifier 123, a second synthesis module 1241, and a probability inferring unit 125.

The preprocessing module 120 may transfer data (hereinafter, raw data) DT1 obtained by preprocessing target data among 3D data collected by the collecting unit 11 and data (hereinafter, virtual preprocessed data) DT2 obtained by preprocessing virtual material data and virtual thickness data to the data filter 121.

The data filter 121 may filter the raw data DT1 to output target filtering data DT11. The data filter 121 may filter the virtual preprocessed data DT2 to output virtual filtering data DT12.

A feature extracting module 1221 may extract target feature data DT21 from the target filtering data DT11. The feature extracting module 1221 may extract virtual feature data DT22 from the virtual filtering data DT12.

Hereinafter, for convenience of description, the target feature data DT21 and the virtual feature data DT22 are referred to as feature data DT20.

The first synthesis module 1222 may generate the first synthesized data DT23 representing durability performance less than a predetermined threshold based on the feature data DT20.

Furthermore, each of the feature data DT20 and the first synthesized data DT23 may include corresponding first feature data DT21_1, DT22_1, and DT23_1, second feature data DT21_2, DT22_2, and DT23_2, and third feature data DT21_3, DT22_3, and DT23_3.

The binary classifier 123 may determine first output data DT3 upon receiving the feature data DT20 and the first synthesized data DT23 as inputs.

The second synthesis module 1241 may generate second synthesized data DT41 based on the first output data DT3.

The probability inferring unit 125 may determine second output data DT5 upon receiving the first output data DT3 and the second synthesized data DT41 as inputs.

The hatched portions among the plurality of data DT1, DT2, DT11, DT12, DT2, DT3, DT41, and DT5 shown in FIG. 2 schematically illustrate the number of data matched to lifetime data representing durability performance less than a predetermined threshold in each of the plurality of data.

Each of the plurality of data DT1, DT2, DT11, DT12, DT2, and DT41 excluding the first output data DT3 and the second output data DT5 may be a plurality of data of a plurality of dimensions. Each of the plurality of data DT1, DT2, DT11, DT12, DT2, and DT41 excluding the first output data DT3 and the second output data DT5 may be a dataset including a number of rows determined based on the number of data and the number of columns determined based on the number of dimensions. For example, data including n data of m dimension may be a dataset including m columns and n rows.

In the virtual preprocessed data DT2, the number of rows representing the durability performance less than the predetermined threshold among the lifetime data may be greater than the number of rows representing the durability performance less than the predetermined threshold among the lifetime data in the raw data DT1.

Furthermore, in the virtual filtering data DT12, the number of rows representing the durability performance less than the predetermined threshold among the lifetime data may be greater than the number of rows representing the durability performance less than the predetermined threshold among the lifetime data in the target filtering data DT11.

Hereinafter, an operation of each component of the controller 12 will be described with reference to the relationship between the plurality of data DT1, DT2, DT11, DT12, DT2, DT3, DT41, and DT5.

Figure 3:
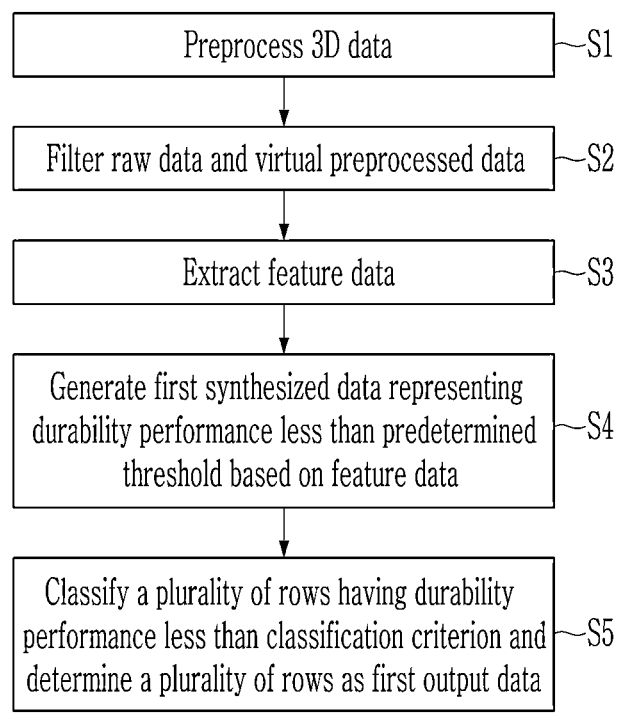
FIG. 3 is a flowchart illustrating a durability evaluation method according to an exemplary embodiment of the present disclosure.

FIG. 3 is a flowchart illustrating a durability evaluation method according to an exemplary embodiment of the present disclosure.

The preprocessing module 120 may preprocess 3D data (S1). Here, the preprocessing may be to remove an outlier in the stress analysis data from the 3D data, perform log transformation, and perform nonlinear scaling. The preprocessing module 120 may improve the scattering degree of 3D data and derive meaningful data through preprocessing.

The preprocessing module 120 may transmit raw data DT1 and virtual preprocessed data DT2 obtained by preprocessing the target data, the virtual material data, and the virtual thickness data to the data filter 121.

Each of the raw data DT1 and the virtual preprocessed data DT2 may include a plurality of rows representing each of the plurality of meshes. Each column of the plurality of rows may include a value based on each of the plurality of stress analysis data and data representing the shape of the mesh, and lifetime data may be matched to each row. The number of columns in each of the raw data DT1 and the virtual preprocessed data DT2 may correspond to the number of external forces applied to the vehicle to extract stress analysis data from the 3D data and the number of parameters representing the shape of the mesh, and the number of rows may correspond to the number of meshes representing the 3D data. The parameters representing the shape of the mesh may include factors related to a thickness of the vehicle body, a normal vector, a curvature, and the like. The lifetime data may not be included in one of a plurality of columns forming each row, but may be included in a separate data column matched to each of the plurality of rows. For example, if the 3D data is 200,000 data of 7 dimensions for 6 external forces and thickness, each of the raw data DT1 and the virtual preprocessed data DT2 is a dataset including 200,000 rows of 7 columns. At the instant time, in the same row in each of the raw data DT1 and the virtual preprocessed data DT2, 6 values based on each of the 6 stress analysis data for one mesh and 1 value based on the thickness are included in each column.

In the raw data DT1, raw data matched to the lifetime data representing durability performance equal to or greater than the predetermined threshold, among the plurality of lifetime data, may correspond to a majority class, and raw data matched to the lifetime data representing durability performance less than the predetermined threshold may correspond to a minority class. The raw data DT1 may be hyper imbalanced data in which a difference between the number of majority classes and the number of minority classes is large. Accordingly, to alleviate the degree of imbalance of the hyper imbalanced data, the preprocessing module 120 transmits the raw data DT1 as well as the virtual preprocessed data DT2 to the data filter 121.

The data filter 121 may filter the raw data DT1 and the virtual preprocessed data DT2 (S2). The data filter 121 may partially eliminate the hyper imbalance of the raw data DT1 to adjust it to a general imbalanced data level.

The data filter 121 may determine a reference (hereinafter, a filter reference) for durability performance indicated by a plurality of lifetime data matched to a plurality of stress analysis data based on the raw data DT1 and the virtual preprocessed data DT2. The filter reference may be a level required for the binary classifier to minimize a possibility of an error in classifying a mesh having a durability performance less than the predetermined threshold. Accordingly, the durability performance represented by the filter reference may be higher than the durability performance represented by the predetermined threshold.

The data filter 121 may be implemented based on a boosting algorithm such as RUSBoost and an ensemble model. The data filter 121 may determine a filter reference for durability performance through a boosting algorithm and an ensemble model based on a plurality of stress analysis data.

The data filter 121 may determine, as the target filtering data DT11, a plurality of rows representing durability performance which is less than the filter reference in the raw data DT1. Each column of the plurality of rows may include the value based on each of the plurality of stress analysis data and the data representing a shape of the mesh, and lifetime data may be matched to each row. Furthermore, the data filter 121 may determine a plurality of rows representing the durability performance which is less than the filter reference in the virtual preprocessed data DT2, as the virtual filtering data DT12. Each column of the plurality of rows may include a value based on each of a plurality of stress analysis data and data representing a shape of the mesh, and lifetime data may be matched to each row.

Hereinafter, a plurality of meshes represented by the target filtering data DT11 are referred to as input meshes.

The number of dimensions of the target filtering data DT11 may correspond to the number of dimensions of the raw data DT1. Also, the number of rows of the target filtering data DT11 may be less than the number of rows of the raw data DT1. The data filter 121 may input the target filtering data DT11 having fewer rows than the raw data DT1 into the feature extracting module 1221, reducing cost for determination of the feature extracting module 1221.

Also, the number of dimensions of the virtual filtering data DT12 may correspond to the number of dimensions of the virtual preprocessed data DT2. Also, the number of rows of the virtual filtering data DT12 may be smaller than the number of rows of the virtual preprocessed data DT2. The data filter 121 may input the virtual filtering data DT12 having fewer rows than the virtual preprocessed data DT2 into the feature extracting module 1221, reducing cost for determination of the feature extracting module 1221.

For example, when the raw data DT1 is 200,000 pieces of data in 7 dimensions, the target filtering data DT11 may be a dataset including 120,000 pieces of data in 7 dimensions, and when the virtual preprocessed data DT2 is 200,000 pieces of data in 7 dimensions, the virtual filtering data DT12 may be a dataset including 120,000 pieces of data in 7 dimensions.

The target filtering data DT11 and the virtual filtering data DT12 may be transmitted to the feature extracting module 1221.

The feature extracting module 1221 may extract the feature data DT3 based on each of the target filtering data DT11 and the virtual filtering data DT12 (S3).

The number of dimensions of the target feature data DT31 may be higher than the number of dimensions of the target filtering data DT11, and the number of rows of the target feature data DT31 may correspond to the number of rows of the target filtering data DT11. The number of dimensions of the virtual feature data DT32 may be higher than the number of dimensions of the virtual filtering data DT12, and the number of rows of the virtual feature data DT32 may correspond to the number of rows of the virtual filtering data DT12.

For example, when the target filtering data DT11 is a dataset including 120,000 pieces of data in 7 dimensions and the virtual filtering data DT12 is a dataset including 120,000 pieces of data in 7 dimensions, the target feature data DT31 is a dataset including 120,000 pieces of data in 28 dimensions and the virtual feature data DT32 is a dataset including 120,000 pieces of data in 28 dimensions.

The feature extracting module 1221 may extract data representing a stress feature, a neighbor stress feature, and a shape feature from each of the target filtering data DT11 and the virtual filtering data DT12 as the feature data DT2.

The target feature data DT21 may include first feature data DT21_1 representing a stress feature based on a plurality of stress analysis data, second feature data DT21_2 representing a neighbor stress feature based on the stress analysis data for each of a plurality of neighbor windows (NGB windows), and third feature data DT21_3 representing a shape feature based on the data indicating the shape of each mesh.

Similarly, the virtual feature data DT22 may include first feature data DT22_1 representing a stress feature, second feature data DT22_2 representing a neighbor stress feature, and third feature data DT22_3 representing a shape feature.

The feature data DT20 may include a plurality of rows. The column of each of the plurality of rows may include a plurality of columns representing corresponding values among the first feature data DT21_1 and DT22_1, a plurality of columns representing corresponding values among the second feature data DT21_2 and DT22_2, and a plurality of columns representing corresponding values among the third feature data DT21_3 and DT22_3.

The neighbor window of a specific mesh may be a concept encompassing meshes (hereinafter, neighbor meshes) located within a predetermined range with respect to the specific mesh.

For example, a plurality of neighbor windows are located stepwise so that a first neighbor window located closest to a specific mesh in a direction away from the specific mesh (hereinafter referred to as an outward direction), a second neighbor window located closest to the first neighbor window in the outward direction, and a third neighbor window located in a second neighbor window in the outward direction.

First, an operation in which the feature extracting module 1221 extracts the first feature data DT21_1 and DT22_1 will be described.

The feature extracting module 1221 may extract first feature data DT21_1 from a value based on the stress analysis data from the target filtering data DT11. The feature extracting module 1221 may extract the first feature data DT22_1 from the value based on the stress analysis data from the virtual filtering data DT12.

For example, it is assumed that the value based on the stress analysis data in the target filtering data DT11 is 120,000 pieces of data in 6 dimensions and the value based on the stress analysis data in the virtual filtering data DT12 is 120,000 pieces of data in 6 dimensions. The feature extracting module 1221 extracts 120,000 stress features in 6 dimensions as the first feature data DT21_1 and extracts 120,000 stress features in 6 dimensions as the first feature data DT22_1. Accordingly, the first feature data DT21_1, DT22_1, and DT23_1 may be 120,000+120,000=240,000 pieces of data in 6 dimensions.

Hereinafter, an operation in which the feature extracting module 1221 extracts the second feature data DT21_2 and DT22_2 will be described.

The feature extracting module 1221 may extract data representing the shape of each of the plurality of meshes from the target filtering data DT11. The feature extracting module 1221 may find a plurality of neighbor windows for each of the plurality of meshes, and extract a value representing stress analysis data to which inverse distance weighting (IDW) is applied with respect to a plurality of neighbor meshes belonging to each of the plurality of neighbor windows, as second feature data DT21_2. Hereinafter, the number of neighbor windows may be previously determined as initial information.

The feature extracting module 1221 may extract data representing the shape of each of the plurality of meshes from the virtual filtering data DT12. The feature extracting module 1221 may find a plurality of neighbor windows for each of the plurality of meshes, and extract a value representing stress analysis data to which inverse distance weighting (IDW) is applied with respect to a plurality of neighbor meshes belonging to each of the plurality of neighbor windows, as second feature data DT22_2.

Hereinafter, an operation in which the feature extracting module 1221 extracts the second feature data DT21_2 and DT22_2 based on the target filtering data DT11 and the virtual filtering data DT12 will be described with reference to FIGS. 4 to 10.

Figure 4:
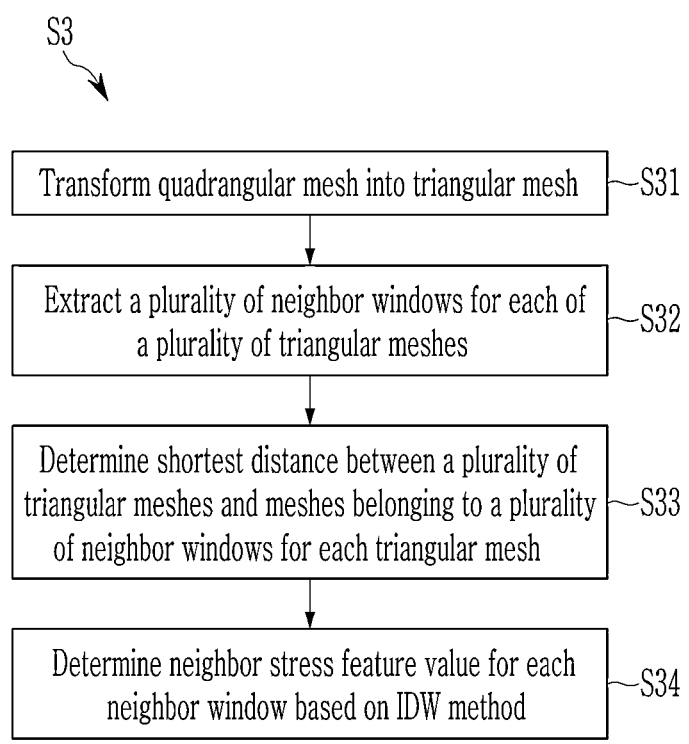
FIG. 4 is a detailed flowchart illustrating an operation of extracting feature data based on a neighbor window in S3 of FIG. 3.

FIG. 4 is a detailed flowchart illustrating an operation of extracting feature data based on a neighbor window in S3 of FIG. 3.

The feature extracting module 1222 may transform a quadrangular mesh among a plurality of meshes represented by the target filtering data DT11 and a plurality of meshes represented by the virtual filtering data DT12 into a triangular mesh (S31). Each of the plurality of meshes represented by the target filtering data DT11 and the plurality of meshes represented by the virtual filtering data DT12 may be either a quadrangular mesh or a triangular mesh. In the instant case, in the case of a quadrangular mesh, a surface of the mesh connecting each vertex of the mesh may not be flat. Because the target filtering data DT11 and the virtual filtering data DT12 are not in a 3D standard format including a quadrangular mesh, the feature extracting module 1222 may transform the target filtering data DT11 and the virtual filtering data DT12 into a 3D standard format to extract the second feature data DT21_2 and DT22_2 and the third feature data DT21_3 and DT22_3. Each of the plurality of meshes represented by the 3D standard format data may be a triangular mesh including three vertices.

To transform the target filtering data DT11 and the virtual filtering data DT12 into a 3D standard format, the feature extracting module 1222 may need to transform a quadrangular mesh, among the plurality of meshes represented by the target filtering data DT11 and the plurality of meshes represented by the virtual filtering data DT12, into a triangular mesh. Because it is difficult to numerically extract the feature data DT20 from the data for the quadrangular mesh, the feature extracting module 1222 may transform the quadrangular mesh into a triangular mesh and transform the target filtering data DT11 and virtual filtering data DT12 to 3D standard format. The feature extracting module 1222 may extract the feature data DT20 from the target filtering data DT11 and the virtual filtering data DT12 in the 3D standard format. A process in which the feature extracting module 1222 transforms a quadrangular mesh into a triangular mesh may be referred to as mesh triangulation. Hereinafter, a quadrangular mesh among a plurality of meshes represented by the target filtering data DT11 and a quadrangular mesh among a plurality of meshes represented by the virtual filtering data DT12 will be referred to as a plurality of quadrangular meshes.

Examples of a quadrangular mesh and a triangular mesh will be described with reference to FIG. 5.

Figure 5:
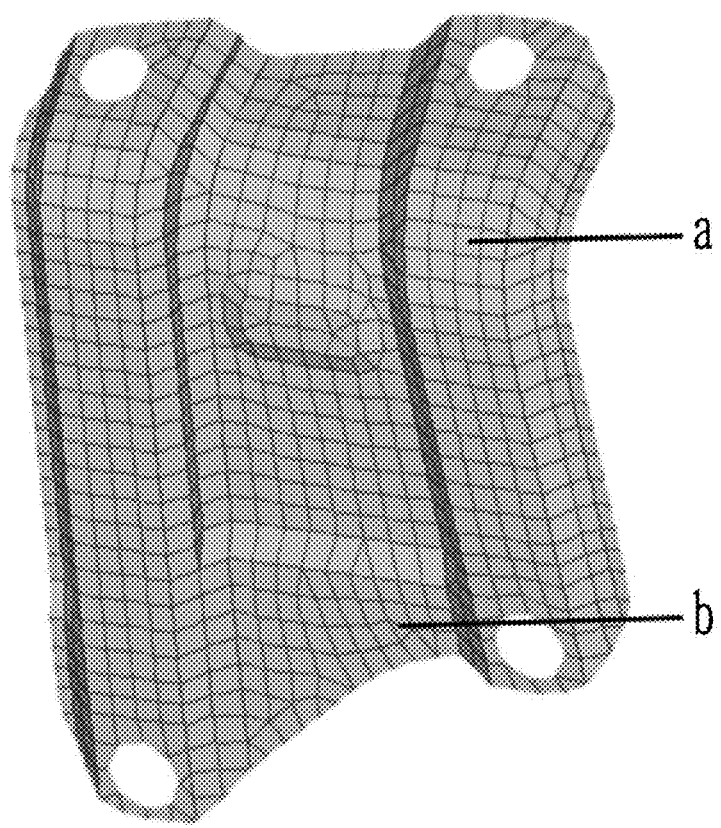
FIG. 5 is a rendering image of a vehicle part in a three-dimensional space.

FIG. 5 is a rendering image of a vehicle part in a 3D space.

As shown in FIG. 5, a vehicle part may be divided into a plurality of meshes.

Referring to FIG. 5, among the shapes of the mesh expressed in the 3D space, a portion indicated by a is a quadrangular mesh and a portion indicated by b is a triangular mesh.

The target filtering data DT11 and the virtual filtering data DT12 may include data representing the shape of each of the plurality of quadrangular meshes. The feature extracting module 1222 may transform each of the plurality of quadrangular meshes into two triangular meshes.

Hereinafter, an operation in which the feature extracting module 1221 transforms one quadrangular mesh among a plurality of quadrangular meshes into two triangular meshes in step S31 of FIG. 4 will be referred to as an example. Each step of FIG. 6 will be described with reference to the diagrams of FIGS. 7 to 9.

Figure 6:
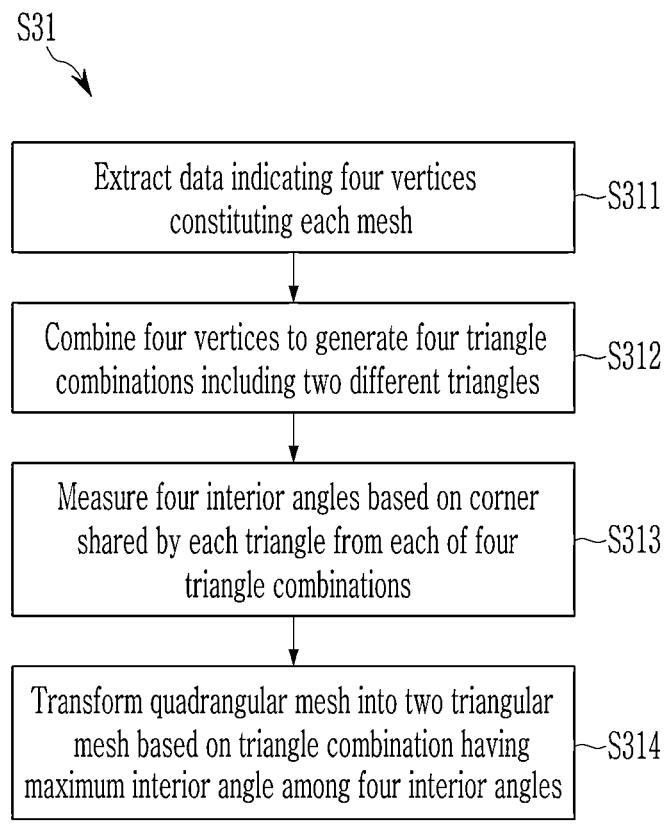
FIG. 6 is a detailed flowchart illustrating step S31 of FIG. 4.

FIG. 6 is a detailed flowchart illustrating step S31 of FIG. 4.

The feature extracting module 1222 may extract data indicating four vertices forming the quadrangular mesh (S311).

Figure 7:
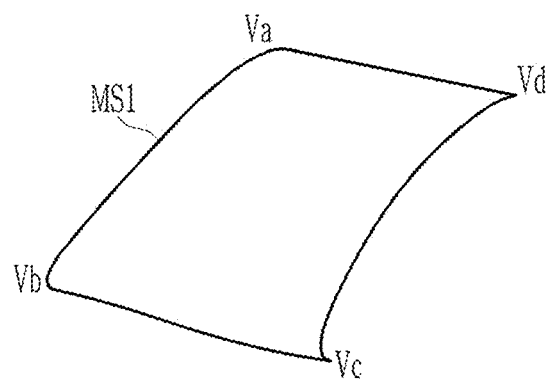
FIG. 7 is a diagram illustrating four points corresponding to vertices of one quadrangular mesh.

FIG. 7 is an exemplary diagram illustrating four points corresponding to the vertices of one quadrangular mesh.

In the example of FIG. 7, the feature extracting module 1222 may extract data indicating four points Va, Vb, Vc, and Vd that are vertices of a quadrangular mesh MS1 from data representing the shape of each of the plurality of quadrangular meshes.

The feature extracting module 1222 may combine four vertices to generate four triangle combinations including two different triangles (S312).

Figure 8:
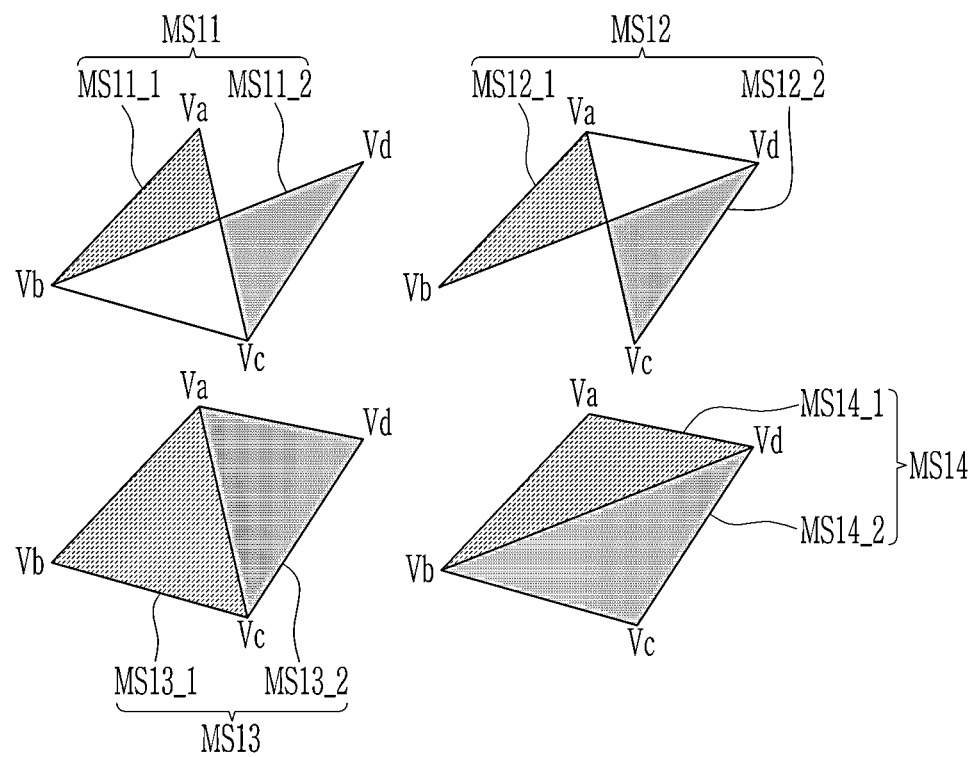
FIG. 8 is a diagram illustrating a combination of four triangles which may be generated from the quadrangular mesh of FIG. 7.

FIG. 8 is an exemplary diagram illustrating four triangle combinations which may be generated from the quadrangular mesh of FIG. 7.

In the example of FIG. 8, the feature extracting module 1222 may generate a triangle combination MS11 including one triangle MS11_1 including points Va, Vb, and Vc, among four points Va, Vb, Vc, and Vd, as vertices and another triangle MS11_2 including Vb, Vc, and Vd as vertices.

Furthermore, the feature extracting module 1222 may generate a triangle combination MS12 including one triangle MS12_1 including points Va, Vb, and Vd, among the four points Va, Vb, Vc, and Vd, as vertices and another triangle MS12_2 including points Va, Vc, and Vd as vertices.

Furthermore, the feature extracting module 1222 may generate a triangle combination MS13_1 including one triangle MS13_1 including points Va, Vb, and Vc, among the four points Va, Vb, Vc, and Vd, as vertices and another triangle MS13_2 including points Va, Vc, and Vd as vertices.

Furthermore, the feature extracting module 1222 may generate a triangle combination MS14_1 including one triangle MS14_1 including points Va, Vb, and Vd, among the four points Va, Vb, Vc, and Vd, as vertices and another triangle MS14_2 including points Vb, Vc, and Vd as vertices.

The feature extracting module 1222 may measure four internal angles based on an edge portion shared by each triangle from each of the four triangle combinations MS11, MS12, MS13, and MS14 (S313).

Figure 9:
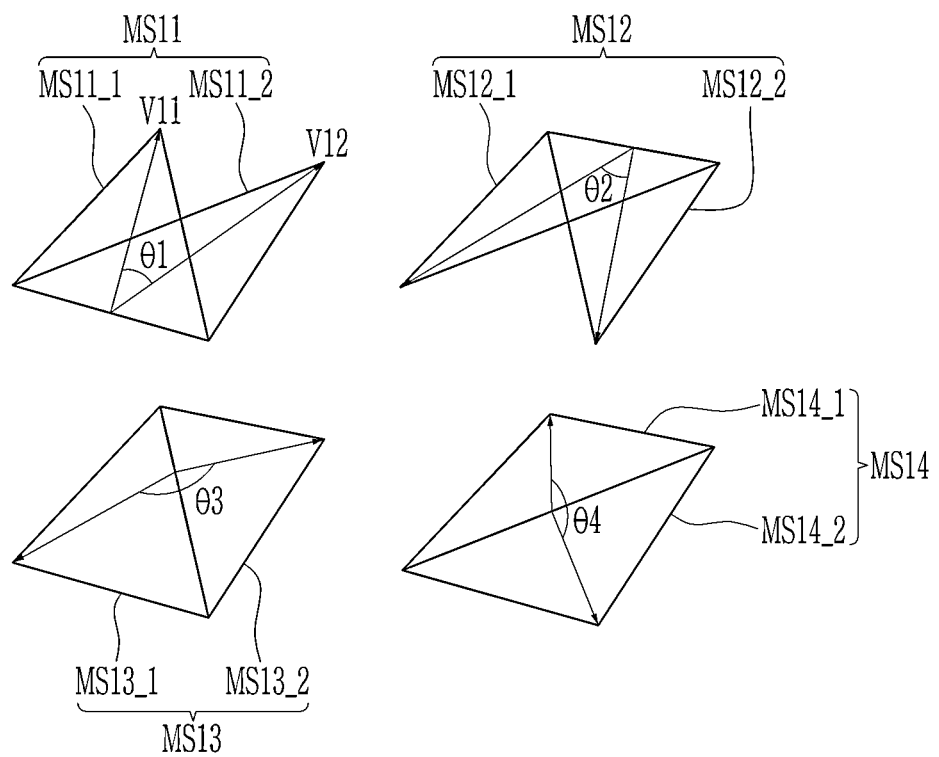
FIG. 9 is a diagram illustrating four internal angles for each of the four triangle combinations of FIG. 8.

FIG. 9 is a diagram illustrating four internal angles for each of the four triangle combinations of FIG. 8.

In the example of FIG. 9, in the triangle combination MS11, the feature extracting module 1222 may extract a sharing edge portion shared by one triangle MS11_1 and the other triangle MS11_2 and points V11 and V12 not shared by the two triangles MS11_1 and MS11_2. The feature extracting module 1222 may extract an internal angle θ1 between a midpoint vector from the centroid of the sharing edge portion toward one point V11 and a midpoint vector from the centroid of the sharing edge portion toward the other point V12.

The feature extracting module 1222 may extract the remaining internal angles θ2 to θ4 from each of the remaining triangle combinations MS12 to MS14 in the present manner.

The feature extracting module 1222 may transform a quadrangular mesh into two triangular meshes based on a triangle combination including the largest internal angle among the four internal angles θ1, θ2, θ3 and θ4 (S314).

The feature extracting module 1222 may transform the quadrangular mesh into two triangular meshes based on the triangle combination including the greatest internal angle. For example, a quadrangular mesh MS1 may be transformed into two triangular meshes in a form of two triangles MS13_1 and VS13_2 based on the triangle combination MS13 including the maximum internal angle θ3. The reason why the feature extracting module 1222 utilizes the internal angle of the triangle combination as a reference for transforming the quadrangular mesh into two triangular meshes is because it may be determined that the shape of the triangle combination including the largest internal angle is the closest to the shape of the quadrangular mesh before transformation.

Hereinafter, for convenience of description, it is assumed that the plurality of triangular meshes represented by the target filtering data DT11 includes an existing triangular mesh and a triangular mesh transformed from a plurality of quadrangular meshes through the operations S311 to S314, a plurality of triangular meshes represented by the virtual filtering data DT12 include an existing triangular mesh and a triangular mesh transformed from a plurality of quadrangular meshes through the operations S311 to S314.

Hereinafter, an operation of extracting the second feature data DT21_2 and DT22_2 based on a plurality of triangular meshes represented by each of the target filtering data DT11 and the virtual filtering data DT12 will be described with reference to FIGS. 4 and 10.

The feature extracting module 1222 may extract a plurality of neighbor windows for each of a plurality of triangular meshes represented by the target filtering data DT11 and the virtual filtering data DT12 (S32).

The k-th neighbor window may be a concept encompassing a k-th neighbor mesh based on each of the plurality of triangular meshes represented by the target filtering data DT11 and the first synthesized data DT21. Hereinafter, k is a natural number equal to or greater than 1, and may be previously determined as initial information.

A first neighbor mesh for a specific mesh is a plurality of triangular meshes that share at least one of vertices and edge portions forming the specific mesh, and in the case of k>1, a k-th neighbor mesh for a specific mesh may be a plurality of triangular meshes excluding a (k−1)-th neighbor mesh, among meshes that share at least one of vertices and edge portions forming the (k−1)-th neighbor mesh.

For example, a second neighbor window ngb2 for one triangular mesh, among a plurality of triangular meshes represented by each of the target filtering data DT11 and the first synthesized data DT21, may include triangular meshes sharing at least one of vertices and edge portions forming one triangular mesh. A third neighbor window ngb3 for one triangular mesh may include one of triangular meshes sharing at least one of vertices and edge portions forming each of triangular meshes belonging to a second neighbor window and a plurality of triangular meshes rather than the triangular meshes belonging to the second neighbor window.

Hereinafter, an operation of the feature extracting module 1222 determining the shortest distance between the meshes based on a plurality of triangular meshes represented by each of the target filtering data DT11 and the virtual filtering data DT12 and extracting a neighbor stress feature based on the shortest distance will be described.

The feature extracting module 1222 may determine the shortest distance between a plurality of triangular meshes represented by each of the target filtering data DT11 and the virtual filtering data DT12 and meshes belonging to a plurality of neighbor windows for each triangular mesh (S33).

When determining the shortest distance between meshes, the feature extracting module 1221 may determine the shortest distance as a geodesic distance indicating a distance based on a surface because vibration is transmitted along the surface. When determining a distance between two vertices, unlike the Euclidean distance, which is a straight-line distance between each vertex, the geodesic distance may be a distance considering a surface because it may connect two vertices along the edge portion of the mesh.

The feature extracting module 1222 may determine a neighbor stress feature value for each of the plurality of neighbor windows based on the IDW method (S34). IDW is a method of interpolating observation values for a reference point, and is an interpolation method in which a smaller weight is applied to observation values for other points as a distance between the reference point and the other points increases.

In an exemplary embodiment of the present disclosure, a plurality of neighboring features ranging from a first neighboring feature to a k-th neighboring feature for each of the plurality of external forces are extracted. To extract a neighboring feature by applying a weighted average of stress analysis data for each of the plurality of neighbor windows ranging from a first neighbor window to a k-th neighbor window for each of the plurality of meshes represented by the target filtering data DT11 and the plurality of meshes represented by the first synthesized data DT21, the IDW method is used.

Referring to Equation 1 below, the k-th neighbor stress analysis data for one external force may be a value obtained by applying a weighted average of IDW to each stress analysis data for one external force.

$$z_{ngb}(k) = \frac{\sum(w_i * z_i)}{\sum w_i} \quad \text{(Equation 1)}$$

Here, $z_{ngb}(k)$ is the k-th neighbor stress analysis data. k is a natural number greater than or equal to 2. $w_i$ is a weight of an i-th mesh among a plurality of meshes belonging to the k-th neighbor window. i is a natural number greater than or equal to 1. $z_i$ is one stress analysis data for the i-th mesh among a plurality of meshes belonging to the k-th neighbor window.

The weight applied to each of the plurality of meshes belonging to the neighbor window may be inversely proportional to the square of the shortest distance based on a specific mesh provided as a reference among the plurality of triangular meshes represented by each of the target filtering data DT11 and the virtual filtering data DT12.

Even k-th neighbor meshes that are the same with respect to a specific mesh may have different distances from the specific mesh as a reference. Therefore, a weighted average method in which a weight of the stress analysis data for a mesh far from a specific mesh, among the same k-th neighbor meshes, is small and a weight of the stress analysis data for a close mesh is large may be applied.

Hereinafter, an operation of the feature extracting module 1222 determining neighbor stress analysis data for each of the neighbor windows will be described with reference to FIG. 10.

Figure 10:
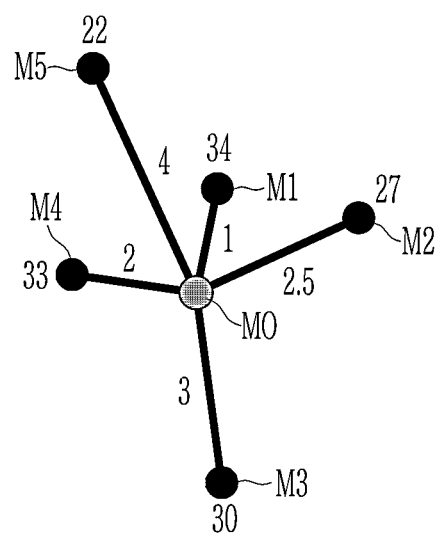
FIG. 10 is a diagram illustrating weights for meshes belonging to a same neighbor window.

FIG. 10 is a diagram illustrating weights for meshes belonging to the same neighbor window.

Referring to FIG. 10, a mesh M0 corresponds to a central element which is a reference mesh, and five meshes M1 to M5 belong to the same neighbor window (e.g., a third neighbor window). One stress analysis data for one external force matched to each of the five meshes M1 to M5 is 34, 27, 30, 33, 22 in order, and distances of the five meshes M1 to M5 based on the mesh M0 are 1, 2.5, 3, 2, 4 in order.

In the example of FIG. 10, the neighbor stress analysis data of the third neighbor window may be determined as 32.38 according to Equation 2 below.

$$z_{ngb}(3) = \frac{\frac{34}{1^2} + \frac{27}{2.5^2} + \frac{30}{3^2} + \frac{33}{2^2} + \frac{22}{4^2}}{\frac{1}{1^2} + \frac{1}{2.5^2} + \frac{1}{3^2} + \frac{1}{2^2} + \frac{1}{4^2}} = 32.38 \quad \text{(Equation 2)}$$

Here, $z_{ngb}(3)$ is third neighbor stress analysis data for the central element, the mesh M0.

Accordingly, for each of the plurality of triangular meshes represented by the target filtering data DT11, the feature extracting module 1221 may extract k neighbor stress features for a plurality of external forces as the second feature data DT21_2. The feature extracting module 1221 may extract, as the second feature data DT22_2, k neighbor stress features with respect to a plurality of external forces for each of the plurality of triangular meshes represented by the virtual filtering data DT12.

Here, two second feature data DT22_2 for each of the two triangular meshes may be extracted from each of the plurality of rows representing the triangular mesh through operations S311 to S314 among the target filtering data DT11. In the instant case, the data included in one row may be transformed into two rows for each of the two triangular meshes.

For example, in the 101st and 102nd rows for one quadrangular mesh M represented by the target filtering data DT11, in a column corresponding to the first feature data DT21_1, a stress feature for the quadrangular mesh M is equally included. In a column corresponding to the second feature data DT21_2, each of a neighbor stress feature for one triangular mesh M1 and a neighbor stress feature for the other triangular mesh M2 among the two triangular meshes M1 and M2 based on the mesh M includes each row. In a column corresponding to the third feature data DT21_3, each of a shape feature for one triangular mesh M1 and a shape feature for the other triangular mesh M2 includes each row.

In one row of the plurality of rows of the feature data DT20, p columns corresponding to the first feature data DT21_1 and DT22_1 include values representing p stress features for each of p external forces, respectively, and p*k columns corresponding to the two feature data DT21_2 and DT22_2 may include values representing the 1st to k-th neighbor stress features for each of the p external forces, respectively.

For example, in one row among the plurality of rows of the feature data DT20, values representing a stress feature for a first external force, a stress feature for a second external force, a stress feature for a third external force, a stress feature for a fourth external force, a stress feature for a fifth external force, and a stress feature for a sixth external force may be included as first feature data in six columns, and in the same row, values representing a first neighbor stress for each of the first, second, third, fourth, fifth and sixth external forces, a second neighbor stress feature for each of the first, second, third, fourth, fifth and sixth external forces, and a third neighbor stress feature for each of the first, second, third, fourth, fifth and sixth external forces may be included as second feature data in 6*3=18 columns.

Hereinafter, an operation of the feature extracting module 1221 extracting the third feature data DT21_3 and DT22_3 will be described.

The feature extracting module 1222 may extract data representing the shape of each of the plurality of meshes from each of the target filtering data DT11 and the virtual filtering data DT12. The feature extracting module 1222 may extract a shape feature for each of the plurality of triangular meshes from data representing the shapes of each of the plurality of meshes.

The shape feature may include at least one of a thickness of a vehicle body corresponding to the mesh, a normal vector of the mesh, a curvature which is an angle between the normal vector of the mesh and a normal vector of a neighbor mesh, and a width of a predetermined number of neighbor windows for a mesh. Here, the normal vector may be a vector which is perpendicular to a surface of the mesh at a specific point of the mesh and points outward of an object. The curvature may be a feature for considering the degree of vulnerability to external impact according to the curvature of each of the plurality of triangular meshes. The width of the predetermined number of neighbor windows may be a feature for considering the degree of vulnerability to external impact according to a location of a portion represented by the corresponding mesh among all the parts to which the mesh belongs in the vehicle body. The width when a location of a portion represented by a specific mesh is the center portion of the vehicle body may be greater than a width when the location is the edge portion of the vehicle body. For example, it is the sum of the widths occupied by meshes belonging to three neighbor windows ranging from a first neighbor window to a third neighbor window with respect to a specific mesh.

The dimension of the third feature data DT22_3 and DT22_3 may be the same as the number of shape features extracted by the feature extracting module 1221 to correspond to each row of the target filtering data DT11 and the virtual filtering data DT12.

For example, if four shape features including a thickness, a normal vector, a curvature, and a width of a predetermined number of neighbor windows are extracted as the third feature data DT22_3 and DT22_3, the third feature data DT22_3 and DT22_3 may be 4D data.

When the first feature data DT21_1 and DT22_1 are p-dimensional n data, the second feature data DT21_2 and DT22_2 are p*k-dimensional n data, and the third feature data DT21_3 and DT22_3 are q-dimensional n data, the feature data DT20 may be n pieces of data in (p+p*k+q) dimensions.

In each of the plurality of rows of the feature data DT20, a class based on lifetime data matched to each row in the target filtering data DT11 and the virtual filtering data DT12 for the binary classifier 123 to learn may be labeled. The class based on the lifetime data may be a class indicating normal data in a row in which the durability performance indicated by the lifetime data matched to each row is equal to or greater than a predetermined threshold, and may be a class indicating abnormal data in a row in which the durability performance indicated by the lifetime data is less than the predetermined threshold.

The first synthesis module 1222 may generate first synthesized data DT23 representing durability performance less than the predetermined threshold based on the feature data DT20 (S4).

The feature data DT20 has a lower degree of imbalance than the raw data DT1, which is hyper imbalanced data, but the feature data DT20 is imbalanced data in which there is a difference between the number of rows representing the durability performance equal to or greater than the predetermined threshold of a majority class and the number of rows representing the durability performance less than the predetermined threshold of a minority class. Accordingly, the first synthesis module 1222 may generate the first synthesized data DT23 corresponding to the minority class to resolve the imbalance.

The first synthesis module 1222 may be implemented using a synthetic minority oversampling technique (SMOTE) method to resolve the imbalance of the feature data DT20. The SMOTE method may utilize a K-nearest neighbor algorithm (KNN). The first synthesis module 1222 may oversample data corresponding to the minority class by the SMOTE method to adjust the ratio with the majority class.

The first synthesis module 1222 may generate the first synthesis data DT23 according to the degree of imbalance of the feature data DT20 by comparing the number of majority classes and the number of minority classes. For example, when there are 100,000 pieces of normal data and 60,000 pieces of abnormal data in the feature data DT20, the first synthesis module 1222 generates 40,000 pieces of first synthesized data DT23 belonging to the abnormal data.

The first synthesis module 1222 may oversample a plurality of rows corresponding to abnormal data among the feature data DT20, as original data (hereinafter, referred to as first SMOTE original data).

The first synthesized data DT23 may include data (hereinafter, first SMOTE data) generated by the first synthesis module 1222 by use of some rows corresponding to the target feature data DT21 among first SMOTE original data as first original data and data (hereinafter, second SMOTE data) generated by use of some rows corresponding to the virtual feature data DT22 among the first SMOTE original data as second original data. The ratio of the first SMOTE data and the second SMOTE data may be determined based on a ratio of the number of rows included in the first original data to the number of rows included in the second original data among the first SMOTE original data. For example, if the ratio of the first original data to the second original data is 1:3 and 40,000 pieces of SMOTE data is to be generated, the first synthesis module 1222 generates 30,000 pieces of first SMOTE data from the first original data and generate 10,000 pieces of second SMOTE data from the second original data.

Because the first synthesized data DT23 is data synthesized based on the first SMOTE original data, it may have a number of dimensions corresponding to the number of dimensions of the first SMOTE original data. For example, if the first SMOTE original data is a dataset of 28 dimensions, the first synthesized data DT23 may also be a dataset of 28 dimensions. Accordingly, the first synthesized data DT23 may include first feature data DT23_1 representing a stress feature, second feature data DT23_2 representing a neighbor stress feature, and third feature data DT23_3 representing a shape feature.

The first synthesized data DT23 may include a plurality of rows corresponding to abnormal data. Each column of the plurality of rows may include a plurality of columns representing a corresponding value among the first feature data DT23_1, a plurality of columns representing a corresponding value among the second feature data DT23_2, and a plurality of columns representing a corresponding value among third feature data DT23_3.

In each of the plurality of rows of the first synthesized data DT23, lifetime data is not matched. The first synthesized data DT23 is not generated using 3D data itself as original data. That is, because it originates from at least one of the first SMOTE original data, the first synthesized data DT23 does not correspond to each mesh. Because the lifetime data is data matched to the mesh, the first synthesized data DT23 does not include lifetime data. However, because each of the plurality of rows of the first synthesized data DT23 is a row generated based on the first SMOTE original data corresponding to the abnormal data, a class indicating abnormal data for the binary classifier 123 to learn may be labeled. Although it has been described that the first synthesis module 1222 is implemented in the SMOTE method, the present disclosure is not limited thereto, and the first synthesis module 1222 may be implemented based on a boosting algorithm such as ADABoost. Also, the first synthesis module 1222 may be included in the binary classifier 122.

The binary classifier 122 classifies a plurality of rows having durability performance less than a predetermined classification criterion (hereinafter, classification criterion) upon receiving multidimensional feature data DT20 and the first synthesized data DT23 as inputs, and determines a plurality of rows as first output data (S5). The classification criterion may be a level of a plurality of dimensions for the binary classifier to classify each of a plurality of rows included in the multi-dimensional feature data DT20 and the first synthesized data DT23 into a class indicating normal data with high durability or a class indicating abnormal data.

The binary classifier 122 determines a predicting classification criterion by targeting lifetime data matched from a plurality of features included in a plurality of columns for each row in the multi-dimensional feature data DT20 and the first synthesized data DT23.

The binary classifier 122 may be implemented based on an ensemble model. For example, the binary classifier 122 may be implemented based on a boosting learning algorithm such as ADABoost.

The binary classifier 122 may generate a plurality of classifiers and combine the classification criterion of each of the plurality of classifiers to finally derive a final classification criterion. The binary classifier 122 may combine the plurality of classification criteria by giving weights to the respective classification criteria of the plurality of classifiers.

The binary classifier 122 may learn a method of determining a classification criterion for predicting lifetime data representing durability performance based on a label of each row and a plurality of features included in a plurality of columns in each of a plurality of rows of the first synthesized data DT23 and the feature data DT20. For example, the binary classifier 122 may train based on the feature data DT20 in which the lifetime data is matched to each row and perform a test using the lifetime data as a target based on the first synthesized data DT23 to which the lifetime data is not matched.

The binary classifier 122 may classify each of the plurality of rows included in the target feature data DT21 into a class indicating normal data or a class indicating abnormal data according to the determined classification criterion.

The binary classifier 122 may determine a plurality of rows classified into a class indicating abnormal data among a plurality of meshes forming the vehicle body as the first output data DT3.

When the binary classifier 122 classifies at least one row among two rows for one quadrangular mesh among a plurality of meshes forming the vehicle body into a class indicating abnormal data, the binary classifier may determine all two rows for one quadrangular mesh as the first output data DT3.

Also, the controller 12 may apply and operate 3D data for another vehicle to the learned binary classifier 122. The controller 12 may extract feature data based on other data, and extract the first synthesized data based on the feature data. The trained binary classifier 122 may determine data representing a mesh corresponding to a row classified into a class indicating abnormal data among a plurality of meshes for another vehicle based on the feature data and the first synthesized data as the first output data DT3.

The output unit 14 may display information representing a mesh represented by each of the plurality of rows of the first output data DT3 on a user interface. For example, the output unit 14 may display a location of a mesh corresponding to a row classified into a class indicating abnormal data in the virtual vehicle body displayed on the user interface in a different color.

The first output data DT3 may include data representing a location of a mesh represented by each of a plurality of rows of the first output data DT3 among a plurality of meshes forming the virtual vehicle body. The first output data DT3 may be used as an indicator for evaluating the durability performance of the vehicle.

Hereinafter, an operation of the probability inferring unit 125 inferring a probability that the durability performance of the mesh represented by each of a plurality of rows of the first output data DT3 of the plurality of dimensions belongs to each of a predetermined number of durability probability sections will be described.

Figure 11:
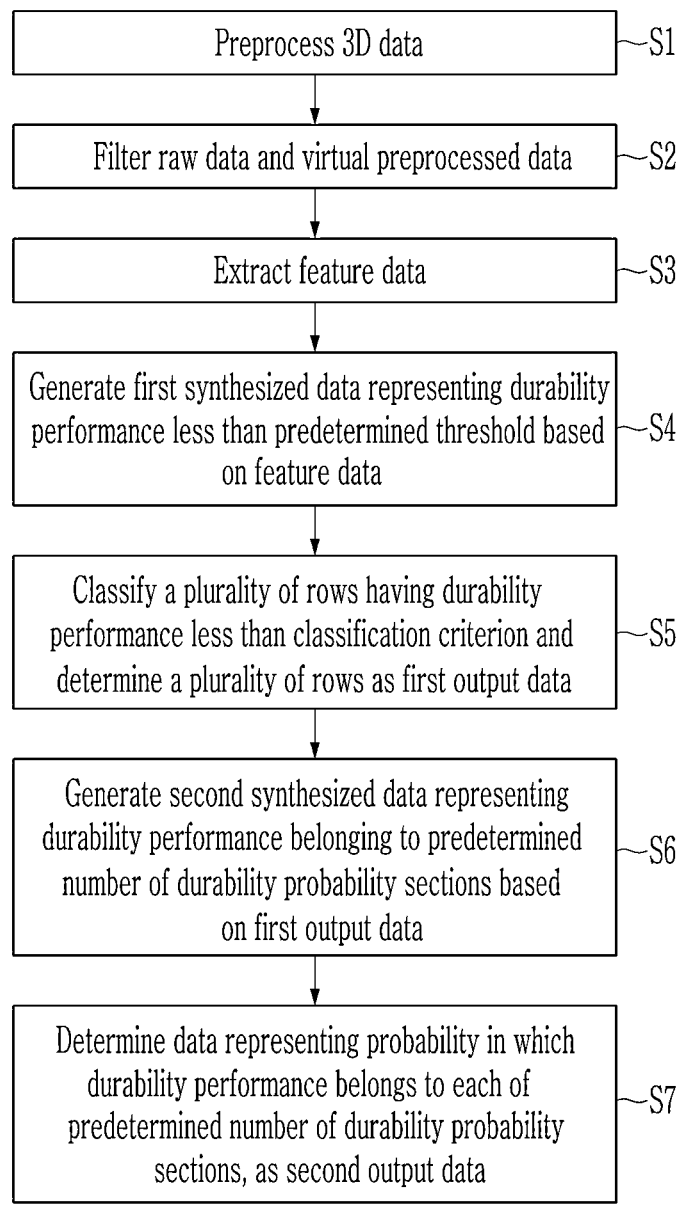
FIG. 11 is a flowchart illustrating a durability evaluation method according to an exemplary embodiment of the present disclosure.

FIG. 11 is a flowchart illustrating a durability evaluation method according to an exemplary embodiment of the present disclosure.

Operations S1 to S5 of FIG. 11 may be performed in the same manner as operations S1 to S5 of FIG. 3, and a description of overlapping parts may be omitted.

The second synthesis module 1241 may generate second synthesized data DT41 representing durability performance belonging to a predetermined number of durability probability sections based on the first output data DT3 (S6). Here, the predetermined number of thresholds provided as the basis of the predetermined number of durability probability sections may be previously determined as initial information. For example, 5 durability probability sections may be previously determined by 4 thresholds for durability performance.

A plurality of rows of the first output data DT3 are imbalanced data in which the number of rows belonging to each of a predetermined number of probability sections is different from each other.

The second synthesis module 1241 may be implemented in a SMOTE method. An operation of the second synthesis module 1241 oversampling based on the original data may be the same as the operation of the first synthesis module 1222 oversampling based on the original data. Hereinafter, it is assumed that the original data of the second synthesis module 1241 is data (hereinafter, referred to as second SMOTE original data) including a plurality of rows of the first output data DT3.

The second SMOTE original data may be divided into a predetermined number of classes belonging to each of a predetermined number of durability probability sections. Hereinafter, for convenience of explanation, the second SMOTE original data is divided into five classes including a first class, a second class, a third class, a fourth class, and a fifth class in an order of the lowest durability performance. Each of the plurality of rows in the second SMOTE original data may belong to any one of five durability probability sections divided into five classes.

The second synthesis module 1241 may generate the second synthesis data DT41 based on five classes. Alternatively, the second synthesis module 1241 may generate the second synthesized data DT41 based on four classes excluding the fifth class having the highest durability among the five classes. Hereinafter, it is assumed that the second synthesized data DT41 is generated based on four classes.

The second synthesis module 1241 may oversample a plurality of rows belonging to each minority class among the second SMOTE original data as original data.

For example, the number of rows belonging to the second class may be the largest. In the instant case, the second class may be considered as a majority class, and the first, third, and fourth classes may be considered as a minority class. Accordingly, the second synthesis module 1241 may generate the second synthesized data DT41 corresponding to the minority class to resolve the imbalance.

The second synthesis module 1241 may compare the number of the majority classes with the number of each of the minority classes to generate the second synthesized data DT41 according to the degree of imbalance of the second SMOTE original data. For example, when there are 1,000, 4,000, 3,000, and 2,000 rows belonging to each of the first to fourth classes in the second SMOTE original data, the first synthesis module 1222 generates the second synthesized data DT41, which is a dataset for 6,000 pieces of data including 3,000 pieces of data belonging to the first class, 1,000 pieces of data belonging to the third class, and 2,000 pieces of data belonging to the fourth class based on the number of majority classes (4,000 in the example).

Since the second synthesized data DT41 is data synthesized based on the second SMOTE original data, it may have the number of dimensions corresponding to the number of dimensions of the second SMOTE original data. For example, if the second SMOTE original data is a dataset of 28 dimensions, the second synthesized data DT41 may also include first feature data representing a stress feature, second feature data representing a neighbor stress feature, and third feature data representing a shape feature, like the feature data DT20.

The second synthesized data DT41 may include a plurality of rows corresponding to abnormal data, and each of the plurality of rows may belong to one of a predetermined number of classes.

In each of the plurality of rows of the second synthesized data DT41, the lifetime data is not matched. The second synthesized data DT41 is not generated based on 3D data itself as the original data. That is, because the second synthesized data DT41 originates from at least one of the second SMOTE original data, the second synthesized data DT41 does not correspond to each mesh. Because the lifetime data is data matched to the mesh, the second synthesized data DT41 does not include lifetime data. However, each of the plurality of rows of the second synthesized data DT41 may be labeled with a class indicating abnormal data for the binary classifier 123 to learn, and at the same time, may be labeled with one of a predetermined number of classes for the probability inferring unit 125 to learn.

Although it has been described that the second synthesis module 1241 is implemented in the SMOTE method, the present disclosure is not limited thereto, and the second synthesis module 1241 may be implemented based on a boosting algorithm such as ADABoost. Also, the second synthesis module 1241 may be included in the probability inferring unit 125.

The probability inferring unit 125 may receive the first output data DT3 and the second synthesized data DT41 as inputs, and determine data representing a probability that the durability performance of each of the plurality of meshes belongs to each of a predetermined number of durability probability sections as second output data DT5 (S7).

The probability inferring unit 125 may be implemented based on a Radial Basis Function Network (RBF Network).

The probability inferring unit 125 may perform membership inference to infer whether each of the plurality of rows in the first output data DT3 and the second synthesized data DT41 belongs to each of a predetermined number of durability probability sections. For membership interference, in each of the plurality of rows of the feature data DT20 and the second synthesized data DT41, the probability inferring unit 125 may learn a method of predicting a probability of belonging to any one of a predetermined number of durability probability sections based on a label which is one of a predetermined number of classes of each row and a plurality of features included in the plurality of columns.

The probability inferring unit 125 may include an input layer including an input vector representing each row of the first output data DT3 and the second synthesized data DT41 and an output layer representing a probability that durability performance belongs to each of a predetermined number of durability probability sections. The probability inferring unit 125 may include an RBF layer in which activation function between the input layer and the output layer is a radial basis function. The probability inferring unit 125 may measure the similarity of the input layer for learning. Each of a plurality of RBF neurons included in the RBF layer may store one of examples of a dataset for training as a prototype. The output layer may be divided into a predetermined number of output categories, each representing a predetermined number of classes. Each output category may represent a weighted sum. The weighted sum may be the sum of values obtained by applying a weight to each of the plurality of RBF neurons. The probability inferring unit 125 may determine a weight of the RBF layer by learning a method of optimizing the output layer into an arrangement which may represent a predetermined number of durability probability sections. The probability inferring unit 125 may represent a membership value corresponding to each class as a probability.

The probability inferring unit 125 may determine data representing a membership value inferred with a probability that the durability performance of each of the plurality of meshes corresponding to the plurality of rows of the first output data DT3 belongs to each of a predetermined number of durability probability sections, as the second output data DT5. In the instant case, the second output data DT5 may be data for the 3D vehicle body of a vehicle, which is a target of the durability performance evaluation.

The second output data DT5 may be obtained by adding, to a separate column, a value representing the probability of belonging to each of a predetermined number of durability probability sections to a plurality of rows of the first output data DT3, by the probability inferring unit 125.

For example, the probability inferring unit 125 may infer a probability that the durability performance represented by each of the plurality of rows belongs to the first class, the probability to belong to the second class, the probability to belong to the third class, the probability to belong to the fourth class, and the probability to belong to the fifth class. In the instant case, the second output data DT5 may include five columns representing each probability of belonging to the first class to the fifth class added to each of the plurality of rows.

Furthermore, the controller 12 may apply 3D data for a different vehicle to the trained probability inferring unit 125 to operate. The controller 12 may extract feature data based on other data, and extract second synthesized data based on the feature data. The trained probability inferring unit 125 may determine data representing a probability that, in which of the predetermined number of durability probability sections, each mesh corresponding to a row classified into a class indicating abnormal data in the binary classifier 123 among a plurality of meshes for another vehicle belongs to, as the second output data DT5.

The output unit 14 may display information indicating the second output data DT5 on a user interface. For example, the output unit 14 may display a probability as a graph on the user interface.

The binary classifier 122 binary-classifies the durability performance of a plurality of meshes forming the vehicle body into data including a value greater than or less than the classification criterion according to a predetermined classification criterion.

Furthermore, because the probability inferring unit 125 represents the durability performance of a plurality of meshes forming the vehicle body as a probability, misclassification may be reduced, compared to evaluating the durability performance of the mesh only through the binary classifier 122, and directionality with high accuracy may be provided in recognizing the durability performance of a vehicle.

The control device may be at least one microprocessor operated by a predetermined program which may include a series of commands for carrying out the method included in the aforementioned various exemplary embodiments of the present disclosure.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A durability evaluation system comprising:
a collector collecting first data, which is data for each of a plurality of meshes forming a vehicle body of a target vehicle, and second data, which is data for each of a plurality of meshes forming a vehicle body of a virtual vehicle in which a material or a thickness of the target vehicle is adjusted, the first data and the second data each being a dataset including a row and a column including a plurality of stress analysis data according to a plurality of external forces for each of the plurality of meshes and data representing a shape of each of the plurality of meshes and being matched to lifetime data corresponding to each of the plurality of meshes; and
a controller configured for determining input data for a plurality of first meshes based on the lifetime data matched to each of a plurality of rows for the plurality of meshes of data obtained by preprocessing the first data and the second data, extracting feature data including features representing the plurality of stress analysis data for each of the plurality of first meshes and each of a plurality of second meshes adjacent to the plurality of first meshes and features representing a shape of each of the plurality of first meshes based on the input data, generating first synthesized data based on the feature data, and learning a method of predicting the lifetime data indicating durability performance based on the feature data and the first synthesized data.

2. The durability evaluation system of claim 1, wherein the controller includes:
a preprocessing module configured for preprocessing the first data and the second data;
a data filter configured for filtering the data preprocessed by the preprocessing module to determine a filter reference for durability performance based on the lifetime data indicating the durability performance of the plurality of meshes and determining, as input data, a plurality of rows for the plurality of first meshes representing durability performance less than the filter reference in the preprocessed data based on the filter reference; and
a feature extracting module configured for extracting first features representing the plurality of stress analysis data for each of the plurality of first meshes, extracting second features obtained by applying an inverse distance weighting (IDW) to the plurality of stress analysis data for each of the plurality of second meshes, and extracting third features representing a shape of each of the plurality of first meshes to generate feature data based on the input data.

3. The durability evaluation system of claim 2, wherein in the feature data, a value based on lifetime data corresponding to a mesh represented by each of the plurality of rows is labeled in each of the plurality of rows.

4. The durability evaluation system of claim 3, wherein the feature extracting module, transforms each of quadrangular meshes among the plurality of first meshes from the input data into two different triangular meshes, extract one or more neighbor windows for each of the plurality of first meshes, determines a shortest distance between the plurality of first meshes and the plurality of second meshes belonging to the one or more neighbor windows, and extracts the second features based on stress analysis data obtained by applying the IDW to each of the one or more neighbor windows according to the shortest distance.

5. The durability evaluation system of claim 4, wherein the controller further includes:
a first synthesis module configured for generating first synthesized data in which the durability performance is less than a predetermined threshold based on the feature data; and
a binary classifier configured for learning a method of predicting lifetime data representing durability performance based on the first features, the second features, and the third features upon receiving the feature data and the first synthesized data and determining, as first output data, data for a mesh representing durability performance less than a predetermined threshold among the plurality of meshes.

6. The durability evaluation system of claim 5, wherein the first synthesis module is configured to generate the first synthesized data by oversampling the first features, the second features and the third features of each of the plurality of first rows in a SMOTE manner based on a plurality of first rows in which the durability performance is less than a predetermined threshold among the feature data.

7. The durability evaluation system of claim 6, wherein the binary classifier is further configured to learn a method of predicting the corresponding lifetime data based on the first features, the second features, and the third features for each of the plurality of rows of the feature data and the first synthesized data and to determine, as the first output data, a plurality of second rows for meshes in which durability performance indicated by the predicted lifetime data among the feature data is less than the predetermined threshold according to a learning result.

8. The durability evaluation system of claim 7, wherein the controller further includes:
a second synthesis module configured for generating second synthesized data representing durability performance belonging to a predetermined number of durability probability sections based on the first output data; and
a probability inferring unit determining, as second output data, data representing a probability of belonging to each of the predetermined number of durability probability sections among the plurality of second rows based on the first features, the second features, and the third features, upon receiving the first output data and the second synthesized data.

9. The durability evaluation system of claim 8, wherein the second synthesis module is configured to generate the second synthesized data by oversampling the first features, the second features, and the third features of each of a plurality of third rows in a SMOTE manner based on the plurality of third rows in which the durability performance belongs to one of a predetermined number of durability probability sections among the first output data.

10. The durability evaluation system of claim 9, wherein the probability inferring unit is configured to learn a method of predicting a probability of belonging to one of the predetermined number of durability probability sections based on the first features, the second features, the third features, and corresponding lifetime data for each of the plurality of second rows, and to determine, as the second output data, a probability in which durability performance indicated by the predicted lifetime data belongs to one of the predetermined number of durability probability sections for each of the plurality of second rows according to a learning result.

11. The durability evaluation system of claim 1, wherein the plurality of external forces includes two or more of:
FR torsion, which is an external force applied to the vehicle while a rear portion of the vehicle is fixed and a front portion of the vehicle is twisted;
RR torsion, which is an external force applied to the vehicle while the front portion of the vehicle is fixed and the rear portion of the vehicle is twisted;
positive max moment, which is an external force applied to the vehicle when fatigue of vibration is maximized in an upward direction in a case in which the vehicle sways sideways;
negative max moment, which is an external force applied to the vehicle when fatigue is maximized in a downward direction in a case in which the vehicle sways sideways;
bending, which is an external force applied to the vehicle in a case in which the vehicle is fixed and a central portion of the vehicle is bent in a vertical direction; and
bouncing, which is an external force applied to the vehicle in a case in which the vehicle bounces in a vertical direction repeatedly.

12. A durability evaluation method comprising:
preprocessing, by a controller, first data, which is data for each of a plurality of meshes forming a vehicle body of a target vehicle, and second data, which is data for each of a plurality of meshes forming a vehicle body of a virtual vehicle in which a material or a thickness of the target vehicle is adjusted and which is data matched to lifetime data corresponding to each of the plurality of meshes, the first data and the second data each being a dataset including a row and a column including a plurality of stress analysis data according to a plurality of external forces for each of the plurality of meshes and data representing a shape of each of the plurality of meshes and being matched to lifetime data corresponding to each of the plurality of three-dimensional (3D) meshes;
filtering, by the controller, to determine input data for a plurality of first meshes based on the lifetime data matched to each of a plurality of rows for the plurality of meshes of the preprocessed data;
extracting, by the controller, feature data including features representing the plurality of stress analysis data for each of the plurality of first meshes and a plurality of second meshes adjacent to the plurality of first meshes and features representing a shape of each of the plurality of first meshes based on the input data;
generating, by the controller, first synthesized data in which durability performance is less than a predetermined threshold based on the feature data; and
learning, by the controller, a method of predicting the lifetime data representing durability performance based on the feature data and the first synthesized data.

13. The durability evaluation method of claim 12, wherein the filtering operation includes
filtering the preprocessed data to determine a filter reference for the durability performance based on the lifetime data representing durability performance of the plurality of meshes; and
determining, as input data, a plurality of rows for the plurality of first meshes representing durability performance which is less than the filter reference among the preprocessed data based on the filter reference.

14. The durability evaluation method of claim 13, wherein the extracting of the feature data includes:
extracting first features representing the plurality of stress analysis data for each of the plurality of first meshes based on the input data;
extracting second features in which an inverse distance weighting (IDW) is applied to the plurality of stress analysis data for each of the plurality of second meshes; and
extracting third features representing a shape of each of the plurality of first meshes.

15. The durability evaluation method of claim 14, wherein the extracting of the second features includes:
transforming each of quadrangular meshes, among the plurality of first meshes, from the input data, into two different triangular meshes;
extracting one or more neighbor windows for each of the plurality of first meshes;
determining a shortest distance between the plurality of first meshes and the plurality of second meshes belonging to the one or more neighbor windows; and
extracting the second features based on stress analysis data to which IDW is applied according to the shortest distance for each of the one or more neighbor windows.

16. The durability evaluation method of claim 15, wherein the transforming of each of the quadrangular meshes into two different triangular meshes includes:
extracting data indicating four vertices forming the quadrangular mesh;
combining the four vertices to form four triangular combinations including two different triangles;
measuring four internal angles based on a corner shared by the two different triangles from each of the four triangle combinations; and
transforming the quadrangular meshes into two triangular meshes based on a triangle combination including a maximum angle, among the four internal angles.

17. The durability evaluation method of claim 15, wherein the generating of the first synthesized data includes:
generating the first synthesized data by oversampling the first features, the second features, and the third features of each of the plurality of first rows in a SMOTE manner based on a plurality of first rows in which the durability performance is less than a predetermined threshold among the feature data.

18. The durability evaluation method of claim 17, wherein the learning of the method of predicting the lifetime data includes:
learning a method of predicting lifetime data based on the first features, the second features, and the third features for each of the plurality of rows of the first synthesized data and the feature data; and
determining, as the first output data, a plurality of second rows for a mesh in which durability performance indicated by the predicted lifetime data, among the feature data, according to the learning result, is less than the predetermined threshold.

19. The durability evaluation method of claim 18, further including:
- generating, by the controller, second synthesized data representing durability performance belonging to a predetermined number of durability probability sections based on the first output data; and
- determining, by the controller, as second output data, data representing a probability of belonging to each of the predetermined number of durability probability sections among the plurality of second rows based on the first features, the second features, and the third features upon receiving the first output data and the second synthesized data.

20. The durability evaluation method of claim 19, wherein the generating of the second synthesized data includes:
- generating the second synthesized data by oversampling the first features, the second features, and the third features of each of a plurality of third rows in a SMOTE manner based on the plurality of third rows in which the durability performance belongs to any one of a predetermined number of durability probability sections among the first output data.

21. The durability evaluation method of claim 20, wherein the determining of data as second output data includes:
- learning a method of predicting a probability of belonging to one of the predetermined number of durability probability sections based on the first features, the second features, the third features, and corresponding lifetime data for each of the plurality of second rows; and
- determining, as the second output data, a probability in which durability performance indicated by the predicted lifetime data belongs to one of the predetermined number of durability probability sections for each of the plurality of second rows according to a learning result.

22. The durability evaluation method of claim 12, wherein the plurality of external forces includes two or more of:
- FR torsion, which is an external force applied to the vehicle while a rear portion of the vehicle is fixed and a front portion of the vehicle is twisted;
- RR torsion, which is an external force applied to the vehicle while the front portion of the vehicle is fixed and the rear portion of the vehicle is twisted;
- positive max moment, which is an external force applied to the vehicle when fatigue of vibration is maximized in an upward direction in a case in which the vehicle sways sideways;
- negative max moment, which is an external force applied to the vehicle when fatigue is maximized in a downward direction in a case in which the vehicle sways sideways;
- bending, which is an external force applied to the vehicle in a case in which the vehicle is fixed and a central portion of the vehicle is bent in a vertical direction; and
- bouncing, which is an external force applied to the vehicle in a case in which the vehicle bounces in a vertical direction repeatedly.

23. A non-transitory computer-readable recording medium having stored thereon a program for performing a method of claim 12.

* * * * *